United States Patent [19]

Siwak et al.

[11] 4,096,998

[45] Jun. 27, 1978

[54] FUEL INJECTOR

[75] Inventors: Eugeniusz Siwak; Andrzej Kraiński; Krzysztof Lendzion; Jerzy Wewiór, all of Warsaw, Poland

[73] Assignee: Warszawskie Zaklady Mechaniczne PZL-WZM, Warsaw, Poland

[21] Appl. No.: 682,169

[22] Filed: Apr. 30, 1976

[51] Int. Cl.[2] ........................ B05B 1/00; F02M 61/14

[52] U.S. Cl. ................................ 239/533.3; 123/32 R; 123/32 JV; 123/139 AW; 151/54; 248/500; 403/262; 403/353

[58] Field of Search ......... 123/139 AW, 32 R, 32 JV; 403/353, 261, 262, 260; 239/533.3; 151/54, 55; 248/500, 507, 508, 25

[56] References Cited

U.S. PATENT DOCUMENTS

| | | | |
|---|---|---|---|
| 493,122 | 3/1893 | Schoaf | 151/54 |
| 516,563 | 3/1894 | Butler | 151/54 |
| 916,997 | 4/1909 | Chadwick | 151/54 |
| 2,388,650 | 11/1945 | Whittell et al. | 248/500 X |
| 2,646,460 | 7/1953 | Del Camp | 248/500 X |

FOREIGN PATENT DOCUMENTS

| | | | |
|---|---|---|---|
| 1,010,783 | 6/1957 | Germany | 403/262 |
| 2,109,727 | 9/1972 | Germany | 123/32 JV |
| 2,262,570 | 6/1974 | Germany | 123/32 R |
| 468,629 | 7/1937 | United Kingdom | 151/55 |

*Primary Examiner*—Irwin C. Cohen
*Attorney, Agent, or Firm*—Haseltine, Lake & Waters

[57] ABSTRACT

A fuel injector is clamped by a pressure yoke by means of one or two bolts, the pressure yoke being in the form of an oval flatted ring. The yoke can be manufactured from a pipe or a flat bar. The yoke has a flat pressure surface, whereas the body of the injector has an arched bearing surface. A flange on the nozzle nut or the face of the nut can also serve as the bearing surface for the yoke.

13 Claims, 10 Drawing Figures

1
2
3
4
5
6
7
8
9
10
12
14
15
16
17
18
P
r

FUEL INJECTOR

FIELD OF THE INVENTION

The invention relate to a fuel injector for internal combustions engines secured by a yoke by means of one or two bolts.

BACKGROUND

In many compression-ignition engines, the fuel injectors are fixed to the cylinder head by two bolts through a flange which is an integral part of the injector body or through a yoke which constitutes a separate component part of the injector. Flange fastening has a number of disadvantages in comparison with yoke fastening due to the fact that in the case of uneven tightening of the nuts for the bolts fixing the flange, the injector can become offset in the seat of the cylinder head, which may cause jamming of the needle of the nozzle. In the case of yoke fastening, the risk of offset of the injector is eliminated by rocking support of the yoke on the body of the injector.

Moreover, flange fastening is also disadvantageous due to the fact that the injector body has to be made as a forging. In the case of yoke fastening, the injector body may be manufactured from bar stock which notably lowers production costs.

The utilization of yoke fastening of the injector, instead of flange fastening is not always possible, as the yoke, being a separate part of the injector, generally takes up more space on the cylinder head than the flange, which is manuafactured as an element of the body. An essential disadvantage of yoke fastening of the injector is the comparatively high cost of the yoke, which as a rule is manufactured by forging, this being the simplest way of manufacturing a flat thick element with an oval outline /see FRG Patent Specification No. 1010783/.

There exists a solution of the injector, in which the fastening yoke is made from a U-shaped section bent from metal plate; nevertheless, the utilization of this solution is limited by the increased overall dimensions of the yoke and by lower bending strength of the section bent from plate /FRG Patent Specification No. 2262570/.

SUMMARY OF THE INVENTION

An object of the present invention is to lower the production costs of injectors by providing a more advantageous solution of fastening.

The present invention contemplates a fastening yoke in the form of an oval flattened ring, surrounding the injector and fixing bolts. The yoke is manufactured from a pipe. The yoke may also be manufactured from a flat bar by appropriate bending of the section of the material and joining its ends by means of pressure welding or conventional welding. The pressure surface of the yoke may be flat, in which case the bearing surface of the injector body should be arched. The yoke may be fastened in a narrowing portion to the center point of the injector body, by bending the ring around the injector body. A yoke in the shape of a flattened ring may also be used on injectors fitted through the nut of the nozzle.

The proposed injector fastening lies within the overall dimensions of flange fastening, which facilitates the utilization of injector bodies made of bar stock for a wider assortment of injectors than up till now. The main advantage of a yoke manufactured from a pipe is a low mass production cost and a high degree of utilization of material. The yoke may be manufactured both from a previously flattened pipe and from a round pipe. A yoke manufactured from a flat bar is also advantageous due to the fact that apart from bending and joining of the ends no further operations are necessary, including the operation of deburring. The above described yoke allows high material savings due to the fact that during the cutting of the flat bar into sections with no waste, the material may be completely utilized.

The manufacture of the yoke may be simplified further in the case when it is easy to form on the injector body an arched bearing surface for the yoke, which may then have a flat pressure surface. An arched shape of the bearing surface on the injector body is easy to obtain during the milling of flats on the injector body.

BRIEF DESCRIPTION OF THE DRAWING

The present invention is described hereafter in the reference to the embodiments shown in the enclosed drawings, wherein.

DETAILED DESCRIPTION

Figures 1, 2, 3, 4:
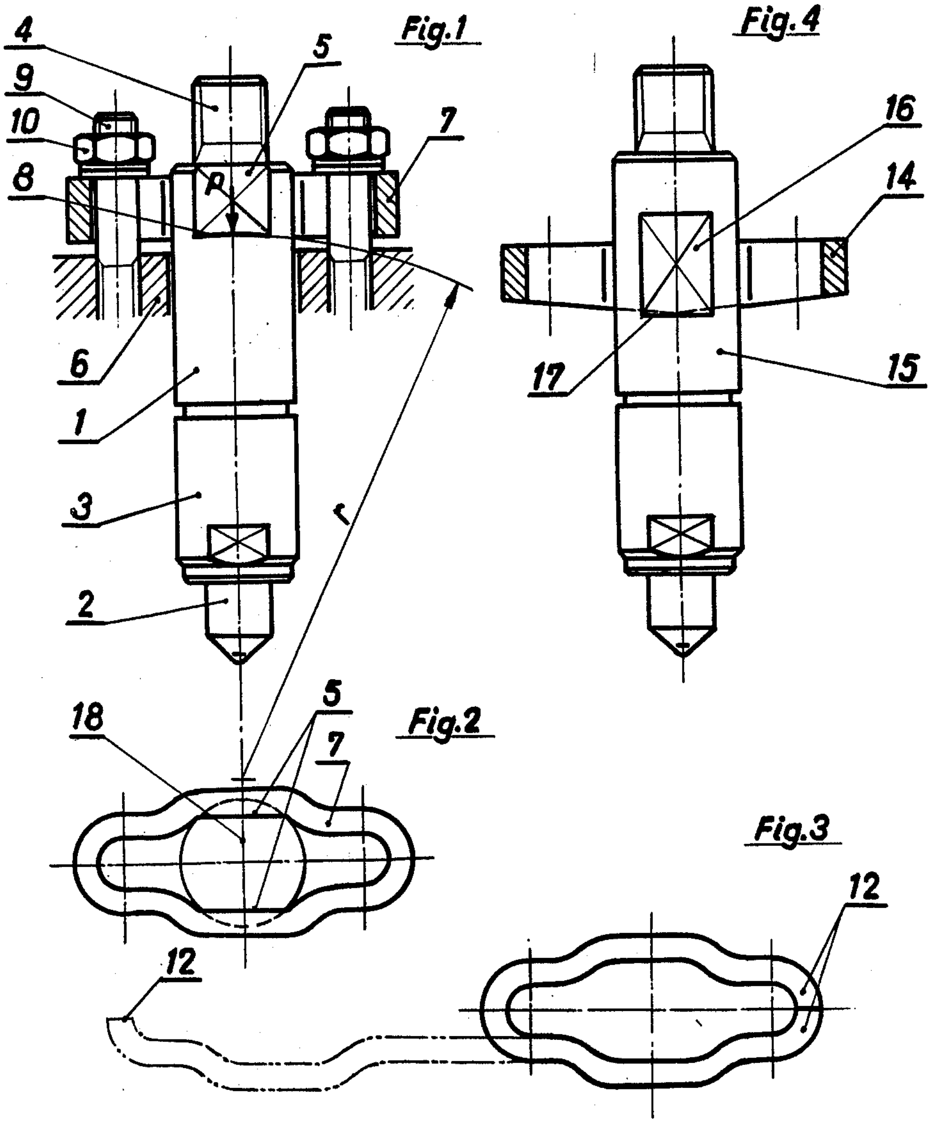
FIG. 1 is a side view of an injector with a first embodiment of a yoke.
FIG. 2 is a top view of the yoke which is made from a flattened pipe.
FIG. 3 is a top view of a yoke made by bending a flat bar.
FIG. 4 is a side view of a second embodiment of the injector with a second embodiment of a yoke fastened in a narrowing middle part to a injector.
Figure 9:
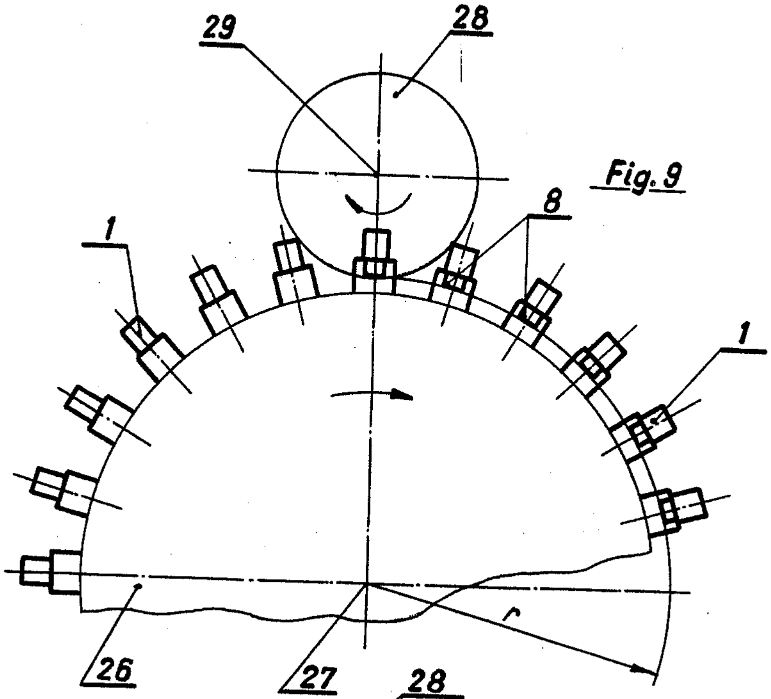
FIGS. 9 and 10 diagrammatically illustrate the machining of flats of the body.
Figure 10:
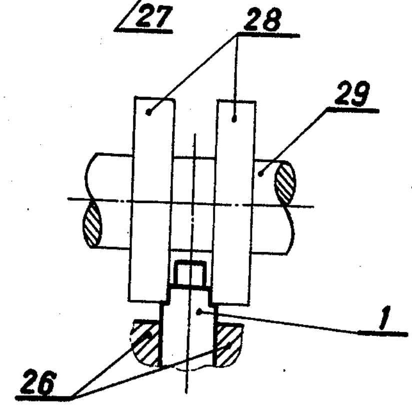

A nozzle 2 is screwed by means of a nut 3 to the body 1 made from bar stock. Formed on the body 1 below a fuel pipe connector 4, are two parallel flats 5 (FIGS. 1 and 2). The injector is clamped in a seat of the cylinder head 6 by a yoke 7, embracing the flats 5 of the body and resting against the bearing surface 8 at these flats. The yoke 7 positions the injector with respect to the seat of the cylinder head 6 by means of the flats 5 and attachment bolts 9. The yoke 7 may be made from a flattened ring or pipe, or from a flat bar and the yoke therefore has a substantially constant section throughout its extent (FIG. 3). The ends 12 of the flat bar, after bending, are joined by pressure welding or conventional welding. The yoke 7 has flat faces, while the bearing surfaces 8 of the injector body are arched. The point of application of the force P fastening the injector in case of a minor offset of the yoke caused by uneven tightening of the nuts on the bolts 9 lies near the axis of the injector, as the offsets at the flats 5 have an arched surface 8. It has been possible to use a yoke with a flat pressure surface due to the fact that the flats 5 are milled in the manner as shown in FIGS. 9 and 10.

FIG. 4 shows a second embodiment of the injector with the yoke 14 set on the narrowing portion of the middle part of the body 15, the above narrowing portion being present due to the flats 16. The partly flattened yoke ring is bent in a jig after mounting the ring on the body. The joint between the yoke 14 and the body 15 is permanent. In this example, the bearing surfaces 17 on the body 15 are flat, while on the lower surface of the yoke 14 a pressure edge, situated on the transverse axis 18 of the yoke is made FIG. 2.

Figures 5, 7:
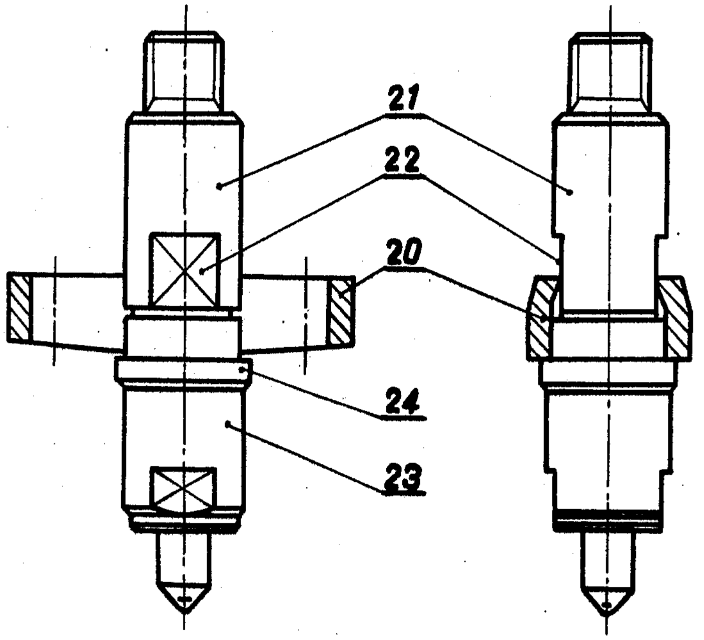
FIG. 5 is an embodiment of an injector with the yoke resting against the flange of the injector nut.
FIG. 7 is a side view of the injector in FIG. 5 with the yoke shown in cross section.
Figure 6:
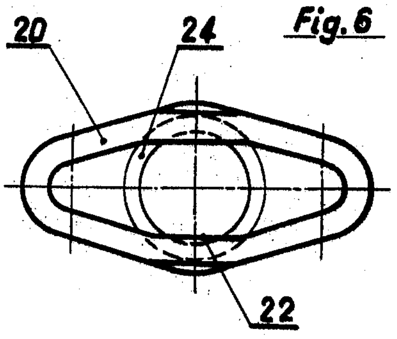
FIG. 6 is a top view of the yoke in FIG. 5.

FIGS. 5, 6 and 7 show a third embodiment of an injector clamped down by a yoke on nut 23 of the nozzle. In this example, the yoke 20 orientates the injector in the seat of the cylinder head by means of the flats 22 of the body 21, the flats being made directly above nut 23 of the nozzle. A flange 24 on the nut acts as the bearing surface for the yoke 20. The middle lower part of the yoke 20 near the nut 23 has an oval shape, while the upper part of the yoke is flattened to the size of the flat 22 on the injector body 21.

Figure 8:
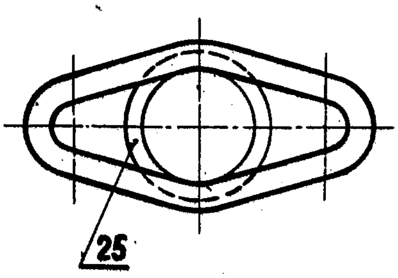
FIG. 8 is top view of the yoke resting against a ring-shaped bearing surface of the injector.

FIG. 8 shows a yoke for clamping an injector through a ring-shaped bearing surface 25, for example, through the face of the nozzle nut or through a flange made on the body of the injector.

As mentioned above, a yoke with a flat pressure surface is simplest to make. Such a yoke may be easily applied to injectors where body flats may be made as shown in FIGS. 9 and 10. The bodies 1 of injectors are mounted in a jig 26 which, rotating about the axis 27, moves the ends of the injector bodies 1 between two end milling cutters 28 mounted on the spindle 29 of the milling machine at such a distance, from one another which is required to obtain the desired size of the flattened part of the body. Thanks to the above method of machining the flats, the arched surface 8 of the offsets on the body 1 is obtained (with radius r), without the need for additional technological operations.

The above discussed embodiments of injectors do not cover in a comprehensive way all the possibilities of the utilization of the invention. Obviously, the invention may also be applied to injectors clamped by a yoke by means of only one bolt, one end of the above yoke resting against the injector and the other end against the cylinder wall or a projection on the above wall.

The presented examples of the implementation of the invention show the possibilities of easy introduction of changes in the details of mounting and orientation of the injector, according to the type of the nozzle and the seat of the cylinder head.

That which is claimed:

1. A yoke for a fuel injector to be secured in an internal combustion engine, said yoke being an oval shaped ring of uniform cross-section throughout its extent and including a waist portion adapted to embrace an injector and at least one projecting portion extending away from the waist portion and constituted as a loop to engage a fixing bolt to secure said yoke.

2. A yoke as claimed in claim 1 wherein said yoke is constituted by a flattened pipe.

3. A yoke as claimed in claim 1 wherein said yoke is constituted by a flat bar having opposite ends which is bent to the oval shape of the ring and having its ends joined together.

4. A yoke as claimed in claim 1 wherein said waist portion of the ring has opposed flat bearing surfaces for engaging flat surfaces a of the fuel injector.

5. A yoke as claimed in claim 1 wherein said ring is constituted by elongated material in the form of an annular body deformed to form said waist portion and said projecting portion.

6. A yoke as claimed in claim 1 wherein said ring is constituted by a bent length of material.

7. The combination of a fuel injector and a yoke by which the injector is adapted for being clamped against a cylinder head, said yoke being an oval shaped ring of uniform cross-section throughout its extent and including a waist portion engaging flats provided on opposed faces of the injector and at least one projecting portion constituted as a loop extending away from the injector, and a fixing bolt engaged in said loop for engaging a cylinder head for clamping the yoke against a cylinder head.

8. The combination as claimed in claim 7 in which said waist portion of said yoke has a lower flat pressure bearing surface, said injector having an arched bearing surface in contact with said flat pressure bearing surface of said yoke.

9. The combination as claimed in claim 7 in which said yoke is mounted on a waist portion at the middle part of the injector.

10. The combination as claimed in claim 9 comprising means for permanently joining said yoke and injector.

11. The combination as claimed in claim 7 in which said injector has a bearing surface for the yoke constituted by a nozzle nut.

12. The combination as claimed in claim 11 in which said flats on the injector are directly above said nut.

13. A yoke as claimed in claim 7 wherein said ring is constituted by a bent length of flat material.

* * * * *